June 8, 1965  A. P. ADAMSON ETAL  3,187,585
DISTANCE MEASURING DEVICE
Filed May 15, 1956  2 Sheets-Sheet 1

Inventors:
Arthur P. Adamson,
Frank M. Clark,
by Alfred B. Levine
Their Attorney.

June 8, 1965  A. P. ADAMSON ET AL  3,187,585
DISTANCE MEASURING DEVICE
Filed May 15, 1956  2 Sheets-Sheet 2

Inventors:
Arthur P. Adamson,
Frank M. Clark,
by Alfred B. Levine
Their Attorney.

United States Patent Office 3,187,585
Patented June 8, 1965

3,187,585
DISTANCE MEASURING DEVICE
Arthur Paul Adamson and Frank M. Clark, Schenectady, N.Y., assignors to General Electric Company, a corporation of New York
Filed May 15, 1956, Ser. No. 585,111
7 Claims. (Cl. 73—490)

This invention generally relates to an apparatus for measuring velocity and distance of travel of a moving body and more particularly to an apparatus for measuring velocity and distance by continuously sensing the acceleration of the body and suitably integrating this acceleration.

One of the known techniques for measuring velocity and distance of travel of a moving vehicle, such as a flight vehicle, along a given path is to continuously measure the acceleration of this vehicle and continuously obtain the single and double integral of this measurement to determine the velocity and distance traveled. However, known apparatus for measuring acceleration and thereafter suitably integrating this measurement to obtain this desired data falls short of meeting the weight, size, stability, and dependability desired if such apparatus is to be used on high speed flight vehicles.

In accordance with the present invention, there is provided an apparatus continuously responsive to accelerational forces for generating an electromagnetic balancing force substantially equal and opposite thereto. By generating this balancing force in a unique manner, signals are obtained proportional to the velocity and the actual distance traveled by the body. Thus, in essence, there is provided a device sensitive to external accelerations and internally operable to develop signals proportional to the single integral and double integral of this acceleration.

It is accordingly one object of the present invention to provide a relatively lightweight, stable, and dependable apparatus of relatively high accuracy for continuously measuring the velocity and distance traveled by a body subjected to accelerations.

Other objects and many attendant advantages of this invention will be more readily comprehended by those skilled in the art upon a detailed consideration of the following specification taken with the accompanying drawings wherein.

Figure 1:
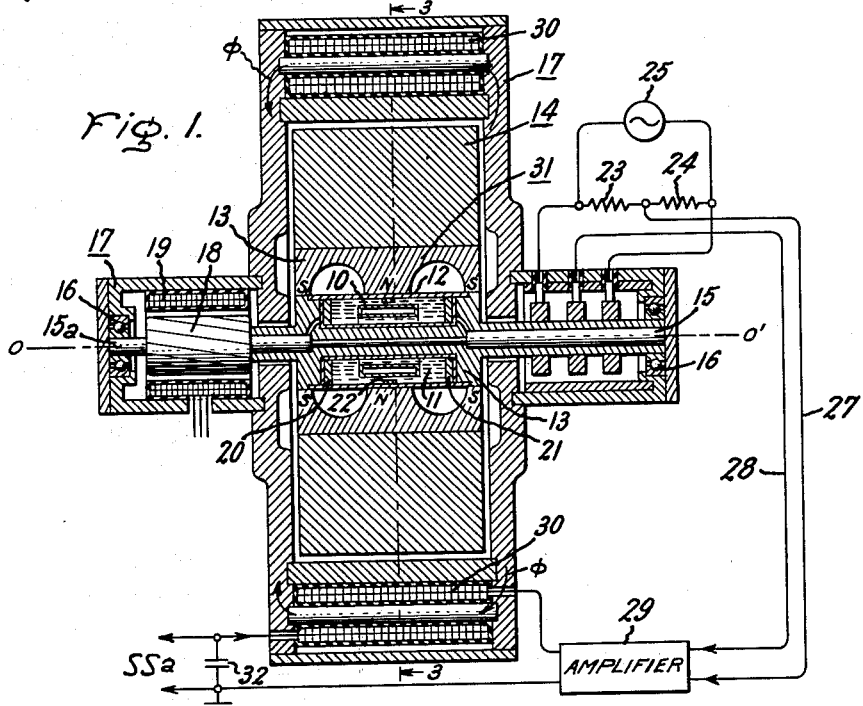
FIG. 1 is a sectional view, in side elevation, of one preferred embodiment of the present invention.
Figure 3:
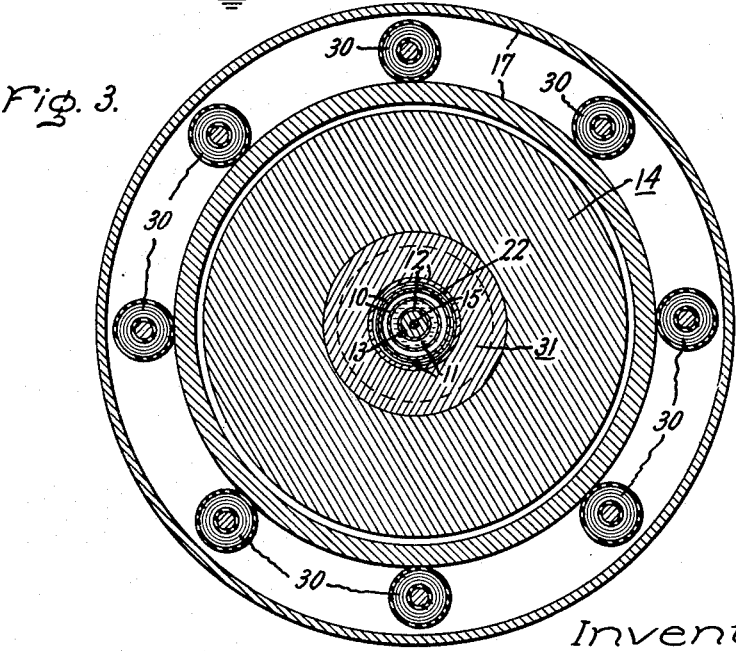
FIG. 3 is an end sectional view taken through lines 3—3 of FIG. 1.
Figure 2:
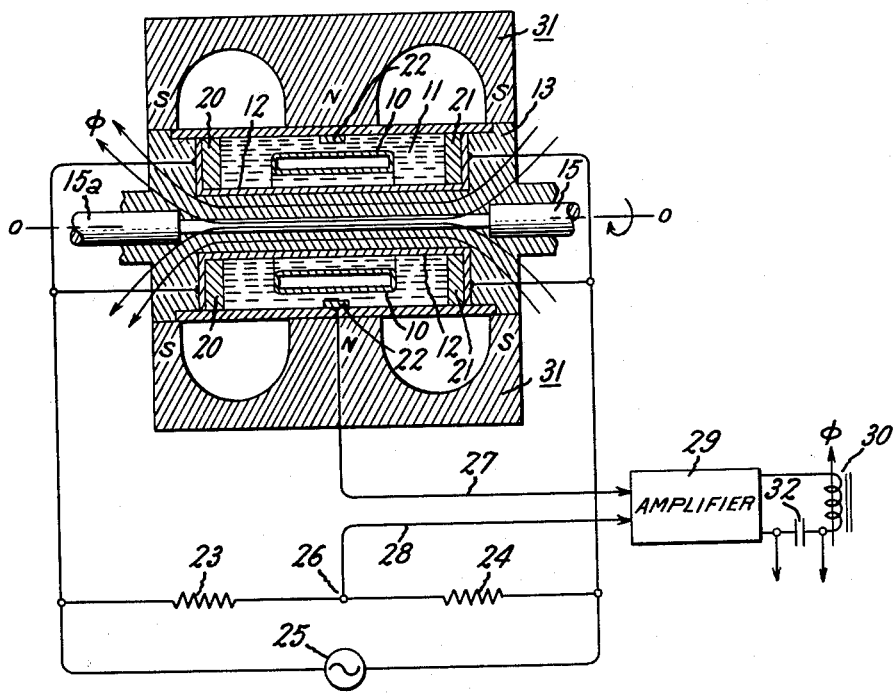
FIG. 2 is a view similar to FIG. 1 illustrating portions thereof in an enlarged manner.

Referring now to FIGS. 1 and 2 for a detailed consideration of one preferred embodiment of the present invention, there is shown an acceleration responsive element 10, preferably toroidally shaped as shown, that is buoyantly suspended in a suitable fluid electrolyte 11; i.e., the specific gravity of element 10 is less than the specific gravity of electrolyte 11, within a larger toroidally shaped hollow housing 12 of non-conducting, non-magnetic material.

As best shown by FIG. 1, the accelerometer housing 12 is preferably rigidly mounted within the central core portion 13 of a cylindrical flywheel member 14 which may be provided with outstanding shafts 15 and 15a projecting from either end thereof and rotatably mounted by suitable bearings 16 within a frame structure 17, whereby the complete flywheel assembly may be rotated at high speed about the axis 0—0 within the hollow generally cylindrically shaped frame structure 17.

The flywheel assembly 14 and its supporting frame structure 17 are preferably portions of a gyroscope rotatably driven at high speed by a gyro motor including a rotor 18 mounted upon the left-hand shaft extension 15a and a stator winding 19 suitably affixed within a portion of the frame 17. As well known to those skilled in the art, the gyro motor and flywheel are preferably mounted within double gimbals (not shown) to provide a stable axis in space along axis 0—0. With this arrangement as is now evident to those skilled in the art, spinning of the motor rotor 18 and flywheel 14 concentrically aligns the positively buoyant acceleration responsive element 10 within its housing 12 about a stable axis 0—0 in space as defined by the rotating gimbal mounted gyro flywheel assembly, but enables the reciprocal movement of this accelertaion responsive element 10 through the fluid 11 in the direction 0—0 with respect to its housing 12 in response to acceleration of the frame structure 17 in the direction 0—0.

In accordance with the present invention, there is provided a means responsive to any relative movement between the acceleration responsive element 10 and its housing 12 along this sensitive axis 0—0 to generate an electromagnetic force equal and opposite thereto. In other words, there is provided a follow-up means responsive to relative movement of element 10 from its centralized position within its housing to generate a reaction force returning this element to its central position.

Included in this follow-up means is an electrical "pick-off" for generating a reversible electrical signal proportional in amplitude and polarity to the relative displacement and direction of displacement, respectively, of element 10 within its housing 12. This pick-off is preferably formed by fastening first and second conducting rings 20 and 21 (FIG. 2) to each opposite end wall of this housing 12 and centrally fastening a third conductor ring 22 about the inner periphery of the housing side wall and equi-distant from the end rings 20 and 21. With this arrangement, two variable resistance paths are established through an electrical conductive fluid 11 whose relative values depend upon the position of the element 10; the first path being formed from end ring 20 through fluid 11 and portions of member 10 to the central ring 22, and the second resistance path being formed from the opposite end ring 21 through the fluid 11 and portions of member 10 to the central ring 22.

To measure the variation in these resistance paths resulting from the displacement of the element 10 from its central position as shown by FIG. 2, these two resistance paths are preferably made a part of a Wheatstone type bridge circuit by connecting each of these end rings 20 and 21 to opposite terminals of two series connected equal value resistors 23 and 24 energized by a suitable potential 25 and obtaining the error voltage, or voltage proportional to the change of these resistant paths, by measuring the potential existing between the fixed resistor center tap point 26 and the centralized ring 22. Thus, there is generated over lines 27 and 28 to an amplifier 29, a potential whose amplitude is proportional to the magnitude of displacement between the acceleration responsive element 10 and its housing 12 and whose polarity is proportional to a direction of this displacement.

To generate this restoring force in response to this error voltage, the direct current output of amplifier 29 is directed to energize a plurality of spaced electromagnetic coils 30 or the like, suitably fastened within the frame structure 17 and disposed about the outer periphery of this structure, thereby generating a magnetic flux through the frame 17 and along the shaft 15–15a (along axis 0—0) and passing through the central axis of the acceleration responsive element 10. Circumferential circulating currents are thereby induced to flow in this element 10 and these currents react with the flux of a permanent magnet 31 suitably mounted within the flywheel assembly 14 and having magnetic poles disposed about housing 12 (FIG. 2). This electromagnetic reaction produces a continuous force on element 10 in the proper direction along the sensitive axis 0—0 to restore the acceleration responsive element 10 to its central position within its housing 12.

Summarizing this operation: acceleration of the structure 17 in the direction 0—0 results in an accelerational force acting upon the element 10 and the fluid in which it floats thereby displacing this element in the direction 0—0 from its central position within the housing 12. An error voltage is thereupon generated proportional in magnitude and polarity to this relative displacement and the direction of this displacement, respectively. This voltage, after being suitably amplified, energizes electromagnetic windings within the frame 17 to generate varying flux proportional thereto through the center of element 10, as indicated by the flux lines in FIG. 2. This changing flux induces circulating circumferential currents in the element, and these currents react with the field of a permanent magnet 31 to provide a restoring force returning the element 10 to its centralized position within housing 12.

Thus it is observed that acceleration of the frame 17 in the 0—0 direction produces an acceleration force causing relative displacement between the element 10 and its housing 12. This force may be mathematically represented as:

$$F = ma = \frac{m d^2 x}{dt^2}$$

Where $m$ is a quantity proportional to the difference between the mass of the acceleration responsive element 10 and the mass of the fluid it displaces, $x$ is the displacement of the frame 17 in the 0—0 direction; and $$\frac{d^2 x}{dt^2}$$

is the acceleration of the frame in the 0—0 direction.

It is further observed that over a period of time the integrated value of the generated electromagnetic force acting upon the acceleration responsive element 10 equals the integrated value of this accelerational force if the element is in fact returned to or substantially maintained at the central position. Hence the force acting upon the element 10 due to the change in flux, which may be mathematically represented as $$k_1 \frac{d\phi}{dt}$$

where $k_1$ is a constant; $\phi$ is the flux passing through 10, and $$\frac{d\phi}{dt}$$

is the rate of change of this flux, must equal the above accelerational force or:

$$\frac{k_1 d\phi}{dt} = m \frac{d^2 x}{dt^2}$$

Integrating both sides of this equation:

$$k_1 \phi = \frac{m dx}{dt}$$

But since the flux generated by the electromagnet windings 30 is proportional to the current being directed into these windings by the amplifier 29 or:

$$\phi = k_2 i$$

Where $k_2$ is a constant and $i$ is the current flowing through the windings 30. Then, substituting this relationship in the above equation mathematically illustrates that the current flowing through these windings 30 is proportional to the velocity of the apparatus:

$$i = \left(\frac{m}{k_1 k_2}\right) \frac{dx}{dt}$$

Consequently, by placing a capacitor 32 in series with the electromagnet windings 30 and the amplifier 29, the voltage across this capacitor is proportional to the distance traveled by the frame during the acceleration. This is shown mathematically as follows:

$$i = c \frac{de}{dt}$$

Where $i$ is the current flowing to the capacitor, $c$ is the capacitance of the capacitor, and $$\frac{de}{dt}$$

is the rate of change of voltage across the capacitor.

Substituting this formula in the above shows that the voltage $e$ across this capacitor is proportional to the distance traveled by the apparatus during the acceleration, or mathematically as:

$$c \frac{de}{dt} = \left(\frac{m}{k_1 k_2}\right) \frac{dx}{dt}$$

or $$e = \left(\frac{m}{c k_1 k_2}\right) x$$

Thus from the above equations it is evident that the voltage across the capacitor 32 is directly proportional to the displacement or distance traveled by the apparatus during the acceleration or the double integral of this acceleration and the current flowing to this capacitor is directly proportional to the velocity of the apparatus during the acceleration.

Although but one preferred apparatus has been illustrated and described, it is evident to those skilled in the art that many changes may be made in the particular structure shown without departing from the spirit or scope of this invention. For example, it is evident that the acceleration responsive element 10 and its housing 12 need not be mounted within the flywheel structure of a gyroscope but may be readily rotated by any of a number of known techniques or rotatably suspended by suitable electrical, magnetic, or mechanical means as desired. Furthermore, it is evident that many changes may be made in the particular configuration of the acceleration responsive element 10 and its housing as well as in the disposition of the electromagnetic coils 30 and permanent magnet structure 31 for yielding the desired motor action to restore this element to its null position. Since these and many other changes may be readily made by those skilled in the art, it is intended that this invention is to be considered as being limited only in accordance with the following claims appended hereto.

What is claimed is:

1. In an integrating accelerometer, a frame member, a housing rotatably mounted within said member, an acceleration sensitive toroidal element, a fluid buoyantly suspending said element within said housing, means for rotating said housing about an axis, means for generating a variable electrical signal current proportional to the relative displacement and direction of displacement of said element and said housing from a central position along said axis and in the direction defined by said axis, means responsive to said signal for generating a variable magnetic field in a direction along said axis to induce a circumferential circulating current within said element, and magnetic means for producing a magnetic field through said element which reacts with said circulating electrical current to produce a force to return said element to its central position.

2. In an integrating accelerometer, a frame member, a housing rotatably mounted within said member, a hollow cylindrical acceleration sensitive element, a fluid buoyantly suspending said element within said housing, means for rotating said housing about an axis, means for generating a variable electrical signal current proportional to the relative displacement and direction of displacement of said element and said housing from a central position along said axis and in the direction defined by said axis, means responsive to said signal for generating a variable magnetic field in a direction along said axis to induce a circulating circumferential current within said element, and magnetic means for producing a magnetic field through said element, said field being substantially normal to said axis in the vicinity of said element, said field reacting with said circulating electrical current to produce a force to return said element to its central position, and means for integrating said electrical signal current to yield a second signal, whereby said second signal is proportional to the double integral of the acceleration of said frame member.

3. In an integrating accelerometer, a housing, a hollow cylindrical acceleration sensitive element, means including a fluid buoyantly suspending said element within said housing, means for rotating said housing about an axis, means for generating a variable electrical signal current proportional to the relative displacement of said element and said housing from a central position, means responsive to said signal for generating a magnetic field to induce a circumferential circulating current within said element, and magnetic means for producing a substantially constant magnetic field through said element, the direction of said field being substantially normal to said circulating current in the vicinity of said element, said field reacting with said circulating current to produce a force to return said element to its central position.

4. In an integrating accelerometer, a housing, a toroidal acceleration sensitive element within the housing and movable with respect thereto, means buoyantly suspending said element within the housing and means for rotating said housing about an axis, means for generating an electrical signal current proportional in amplitude and polarity to the relative displacement between said element and housing, electromagnetic means responsive to said current for directing a varying magnetic field through said element to induce circumferential circulating currents therein, and permanent magnetic means for producing a magnetic field through said toroidal element substantially normal to the circulating currents induced in said element, said field reacting with said circulating currents to generate a force to return said element to its central position.

5. In an integrating accelerometer a frame member, a housing mounted for rotation about an axis of rotation within said member, said housing having a core of magnetic material, said core having a longitudinal axis, said longitudinal axis substantially coinciding with said axis of rotation, a toroidal acceleration sensitive element of nonmagnetic electrical conductor mounted around said core, an electrically conductive fluid within said housing, said fluid producing a buoyant force on said acceleration sensitive element, a plurality of spaced electrical conducting members fixedly positioned within said housing, circuit means responsive to the change in the electrical resistance between said electrical conducting members resulting from the relative displacement of said element in said housing for generating an electrical signal proportional to the deviation of said element from a given position on said core in a direction parallel to said axis, means responsive to said signals for producing a variable magnetic field through said core, changes in the magnitude and direction of said variable magnetic field inducing circumferential circulating currents in said element, permanent magnetic means secured to said frame member for producing a substantially constant uniform magnetic field through said element, the direction of said field in the vicinity of said element being substantially normal to the axis of rotation, whereby said element is caused to substantially remain in said given position.

6. In an accelerometer, a cylindrical housing having a central core portion, said core portion being made of magnetic material and having a longitudinal axis, said core portion defining a toroidal chamber within said housing, a toroidal acceleration responsive element made of a nonmagnetic, electrically conductive material and mounted around said core portion for movement parallel to said longitudinal axis, a fluid filling said chamber, the size and weight of the acceleration responsive element being such that it weighs less than the fluid it displaces, means for rotating said housing about an axis of rotation which substantially coincides with the longitudinal axis of the core, means for generating a signal which is a function of the displacement of the acceleration responsive element from a given position within the chamber, and electromagnetic means including said core, responsive to said variable signal for producing a force to restore and substantially maintain said acceleration responsive element at said position.

7. In an accelerometer a cylindrical housing having an outer wall portion of nonmagnetic electrically nonconductive material and a central core made of a magnetic material and having a longitudinal axis, the outer wall portion and the central core forming a toroidal chamber, a toroidal acceleration responsive element made of a nonmagnetic, electrically conductive material, said element being mounted around the core for movement parallel to the longitudinal axis of the core, a fluid filling said chamber, the size and weight of the toroidal element being such that it weighs less than the fluid it displaces, means for rotating the housing about an axis of rotation which substantially coincides with the longitudinal axis of the core, means for generating a variable electric signal which is a function of the displacement of the acceleration responsive element from a given position within the chamber, magnetic means mounted on said housing for establishing a magnetic field of substantially constant intensity through the acceleration responsive element, the direction of the magnetic field through said element being substantially normal to the longitudinal axis of the core, and electromagnetic means responsive to the variable signal for establishing a magnetic field of varying intensity and direction through the core to induce electric currents in said element, the interaction between the induced currents in said element and said magnetic field through the element creating a force which tends to maintain the element at said given position.

References Cited by the Examiner

UNITED STATES PATENTS

| | | | |
|---|---|---|---|
| 2,136,219 | 11/38 | Scherbatskoy | 264—1 |
| 2,591,921 | 4/52 | Cosgrief et al. | 264—1 |
| 2,677,270 | 5/54 | Sanderson | 264—1 |
| 2,776,560 | 1/57 | Erath et al. | 264—1 |
| 2,797,912 | 7/57 | Trostler | 264—1 |
| 2,840,366 | 6/58 | Wing | 264—1 |
| 2,853,287 | 9/58 | Draper et al. | 264—1 |

RICHARD C. QUIESSER, *Primary Examiner.*

SAMUEL BOYD, ARTHUR M. HORTON, *Examiners.*